April 30, 1935.  H. E. HERSHEY  1,999,810
INDICATING SYSTEM
Filed June 10, 1932   2 Sheets-Sheet 2

Inventor
Harry E. Hershey
R G Richardson
Atty.

Patented Apr. 30, 1935

1,999,810

UNITED STATES PATENT OFFICE 1,999,810

INDICATING SYSTEM

Harry E. Hershey, Chicago, Ill., assignor to Associated Electric Laboratories, Inc., Chicago, Ill., a corporation of Delaware Application June 10, 1932, Serial No. 616,512

7 Claims. (Cl. 177—337)

The present invention relates in general to indicating systems but more particularly to an aircraft position indicating system for use at a dispatcher's office to enable a dispatcher to keep informed at all times of the positions of all airplanes which are traveling over the route under his observation.

According to one feature of the invention, the dispatcher or observer is provided with a display board having a plurality of indicating lamps to indicate the positions of all airplanes flying over the route. These lamps are controlled by the dispatcher by means of automatic switching apparatus under the control of a dial at the dispatcher's desk.

According to another feature of the invention, each plane flying over the route is assigned a code number. When the dispatcher receives a report from a plane that it is over a particular point, he dials the code number of the plane thereby advancing the lamp indication to the station from which the plane has just reported. In this manner the dispatcher is informed at all times of the positions of all planes on the route.

According to a further feature of the invention, if a plane does not report within the time allotted to it to reach the next report point and the dispatcher, therefore, has not dialed the code number of the plane to advance the lighted lamp to the succeeding report point, the lamp corresponding to the overdue plane will flash to indicate to the dispatcher that the plane is overdue at the succeeding report point. The dispatcher may then take steps to get in touch with the pilot of the plane.

Figure 1:
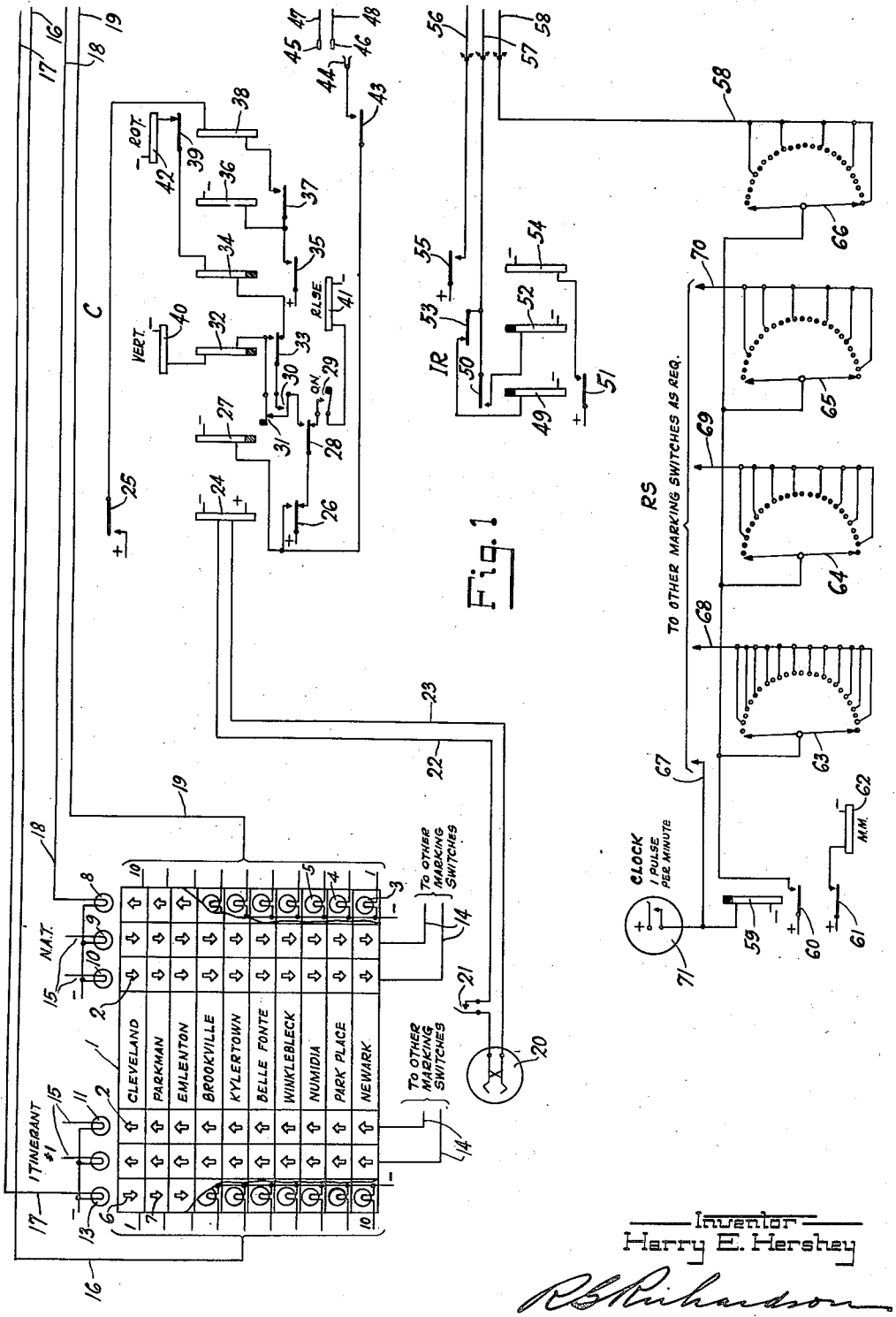
Figure 2:
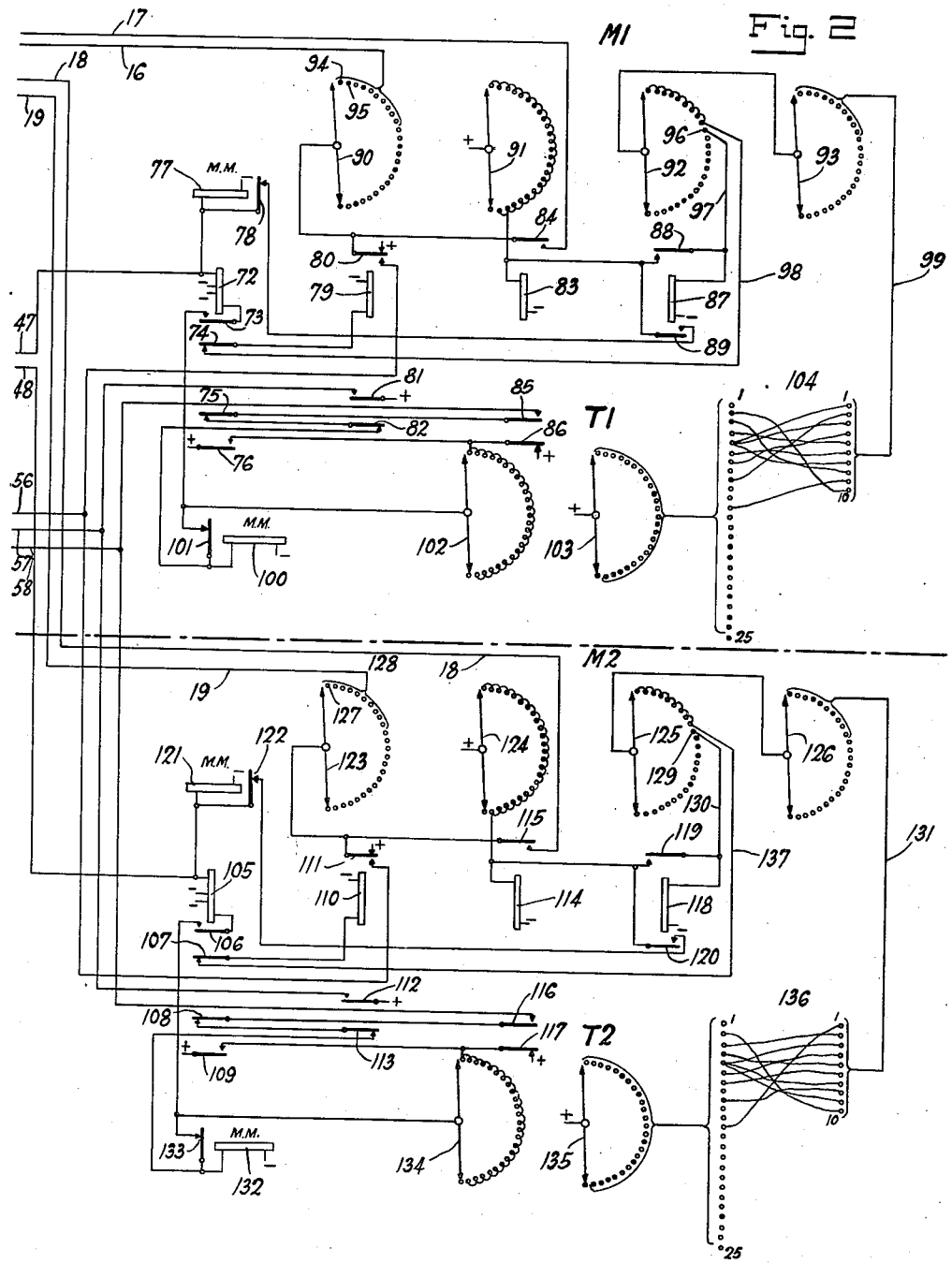

The manner in which the foregoing and other features of the invention are carried out will be clear from the following specification when read in connection with the accompanying drawings comprising Figs. 1 and 2 which show by means of the usual schematic diagram a particular embodiment of the present invention.

In Fig. 1, in the upper left-hand corner, is shown the display board which is provided at the dispatcher's station. This display board contains the names of all the points from which the planes are instructed to report on the particular route over which the dispatcher has control. The particular route shown for the purpose of illustration is from Cleveland, Ohio to Newark, New Jersey. Fig. 1 also discloses the connector switch C by means of which the dispatcher controls the lamps on the display board, interrupter relays IR which are provided to generate impulses for the flashing of the lamp to indicate overdue planes, and the rotary switch RS controlled by a master clock delivering impulses at the rate of one per minute, this rotary switch being arranged to transmit impulses over conductors 67, 68, 69, 70, and 58 at the rates of one impulse per minute to one impulse per five minutes, respectively.

Fig. 2 of the drawings discloses the apparatus necessary for taking care of two planes flying over the route. A marking switch, such as M1, and a timing switch, such as T1, shown in the upper portion of the drawings, are required for each plane flying over the route. A cross-connecting block, such as 104, is provided to cross-connect from the banks of the timing switch T1 to the banks of the marking switch M1 to allow the proper time intervals between the various report points on the route, as will be fully explained hereinafter.

Referring now to the drawings, a complete description of the operation of the invention will now be given. As previously stated, the display board located at the dispatcher's position comprises a face panel on which appear the names of the various report points along the route from Cleveland to Newark. The face of the panel also has a number of vertical columns of transparent arrows behind which are mounted the indicating lamps. A row of lamps and arrows are provided for each plane flying over the route from Cleveland to Newark. The particular report board shown provides for planes belonging to two different companies, for example, N. A. T. and Itinerant #1. It is assumed that N. A. T. has two planes flying from Cleveland to Newark and one plane from Newark to Cleveland and Itinerant #1 has two planes flying from Newark to Cleveland and one plane from Cleveland to Newark. It will, of course, be understood that the particular display board is for illustrative purposes only and any number of planes may be provided for. The marking switch M1 and timing switch T1 shown in the upper portion of Fig. 2 of the drawings are associated with the left-hand column of lights indicating a plane owned by Itinerant #1. The marking switch M2 and timing switch T2 shown in the lower portion of Fig. 2 are associated with the right-hand column of lights indicating a plane owned by the N. A. T. The lights are connected to one bank of the marking switches by means of cables such as 16, 19, and 14. An individual lamp, such as 8 to 13, inclusive, is provided for each plane traveling over the route.

It will be assumed that a plane belonging to N. A. T. is leaving Newark and that the code number 51 has been assigned to this plane. When the dispatcher receives the report that the plane has left Newark, he lights the lamp 8 and the lamp 3 indicative of the plane and the point from which it is starting. To do this, the dispatcher closes the key 21 and then operates the dial 20 in accordance with the digits 5 and 1. Responsive to the closure of the key 21, a circuit is closed for line relay 24 of connector C from negative battery, upper winding of relay 24, conductor 22, key 21, dial 20, conductor 23, lower winding of relay 24 to positive battery. Relay 24 operates and at armature 26 and its working contact it completes an obvious circuit for slow release relay 27. Relay 27 operates and at armature 28 and its resting contact opens a point in the release circuit of the switch and at the working contact of this armature prepares a circuit for the vertical magnet 40.

Line relay 24 is momentarily released five times responsive to the dialling of the first digit 5 and each time it releases it completes a circuit from positive battery, armature 26 and its resting contact, armature 28 and its working contact, off-normal contact 31, winding of series relay 32, winding of vertical magnet 40, to negative battery. Vertical magnet 40 responds to the impulses over this circuit and raises the switch shaft and wipers five vertical steps to a point opposite the fifth row of bank contacts. At the first vertical step, off-normal contacts 30 are closed and contacts 31 are opened and the impulsing circuit thereafter extends over armature 33 of relay 32, which operates on the first impulse. At the end of the impulse series, line relay 24 remains operated and the slow-to-release series relay 32 deenergizes after a short interval. At armature 33 and its resting contact it prepares the circuit for the rotary magnet in series with relay 34.

Responsive to the dialling of the next digit 1, relay 24 releases momentarily and at armature 26 and its resting contact completes a circuit extending from positive battery, armature 26 and its resting contact, armature 28 and its working contact, off-normal contacts 30, armature 33 and its resting contact, winding of slow-to-release relay 34, armature 39 and its resting contact, winding of rotary magnet 42, to negative battery. The rotary magnet 42 energizes and rotates the wipers of the switch into engagement with the first set of bank contacts in the fifth level. Relay 34 energizes in series with the rotary magnet and at armature 35 and its working contact completes the circuit for relay 36. Relay 36 operates and at armature 37 and its working contact prepares a circuit for relay 38 in series with relay 36.

After the cessation of the rotary impulse series, relay 34 releases after an interval and at armature 35 and its working contact opens the initial energizing circuit for relay 36 and removes the shunt from the winding of relay 38 to allow this relay to operate in series with relay 36 from positive battery, working contact of armature 25 and said armature, winding of relay 38, working contact of armature 37 and said armature, winding of relay 36, to negative battery. Relay 38 at armature 39 and its resting contact opens the circuit of the rotary magnet, and at armature 43 and its working contact extends positive battery from armature 26 and its working contact over wiper 44 and bank contact 46 to conductor 48 extending to the marking switch M2 shown in Fig. 2 of the drawings.

The positive battery connected to conductor 48 extends over the winding of the motor magnet 121 to negative battery. Motor magnet 121 energizes preparatory to advancing the wipers of the marking switch M2 upon its deenergization and relay 105 also energizes in the above-traced circuit. At armature 106 and its working contact it prepares a locking circuit for itself through wiper 134 and its bank contacts and armature 109 to positive battery, which locking circuit is not completed at this time, at armature 107 and its resting contact it opens a point in the circuit of relay 110, at armature 108 and its resting contact it opens a point in the circuit for the motor magnet 132 of the timing switch T2, and at armature 109 and its working contact it prepares the homing circuit for the timing switch T2.

No further operations occur until the dispatcher opens the key 21 which he does as soon as he has dialled the code number 51. Responsive to the opening of the key, line relay 24 of connector C releases and at armature 26 and its resting contact prepares the circuit for the release magnet 41 over off-normal contacts 29. At the working contact of armature 26 it opens the circuit of release relay 27 and also removes positive battery potential from wiper 44 and from the conductor 48 extending to marking switch M2. Release relay 27 releases after an interval and at armature 28 and its resting contact completes the circuit for the release magnet 41, which energizes and restores the switch to normal. The circuit of the release magnet is opened at off-normal contacts 29 when the switch wipers and shaft have reached their normal position.

When positive battery potential is removed from conductor 48, operating magnet 121 releases and advances the wipers 123 to 126, inclusive, of marking M2 one step into engagement with the first set of bank contacts. Relay 105 also releases when positive battery potential is removed from conductor 48. When wiper 124 engages its first bank contact, a circuit is completed from positive battery over the multiple bank contacts 1 to 24 associated with wiper 124 through the winding of the relay 114 to battery. Relay 114 operates and at armature 117 and its resting contact opens the homing circuit of the timing switch T2, at armature 115 and its working contact completes a circuit for the lamp 8 at the display board which indicates the plane which has just left and indicates that this plane belongs to the N. A. T. At armature 116 and its working contact it completes the impulsing circuit to the magnet of the timing switch T2 as will be explained later. When wiper 123 engages its first bank contact, a circuit is completed from positive battery at the resting contact of armature 111 and said armature, wiper 123 and its first bank contact, wire 1 in cable 19 extending to the right-hand row of lamps in the display board, lamp 3, to negative battery. Lamp 3 lights up and indicates that the plane indicated by lamp 8 belonging to N. A. T. has just left Newark.

The rotary switch RS shown in Fig. 1 of the drawings is provided to generate positive battery pulses at various rates from one per minute to one per five minutes. The switch is controlled from a master clock 71 which closes its contact once each minute thereby connecting ground to conductor 67 which is the one impulse per minute conductor, and also for operating the slow-to-operate relay 59. Relay 59 operates at each impulse and at armature 61 and its working contact completes the circuit for the magnet 62 of the rotary switch RS. The magnet 62 energizes preparatory to advancing the switch wipers. At armature 60 and its working contact, relay 59 connects positive battery to wipers 63 to 66, inclusive, of the rotary switch. When the contacts in the master clock are again opened, relay 59 releases and at armature 60 removes positive battery from the wipers of the switch, and at armature 61 opens the circuit of magnet 62. The magnet releases and advances the switch wipers one step.

Thus it is seen that the switch wipers are advanced one step each minute. The conductor 67 is connected directly to the impulsing contacts in the master clock and an impulse of positive battery is, therefore connected thereto each minute. The conductor 68 is multiplied to every second contact in the bank of wiper 63 and an impulse of positive battery is, therefore, connected thereto every two minutes. Conductor 69 is connected to every third bank contact in the bank of wiper 64 and receives a positive battery impulse every three minutes, conductor 70 is connected to every fourth bank contact in the bank of wiper 65 and receives an impulse every four minutes, and conductor 58 is connected to every fifth bank contact in the bank of wiper 66 and receives a positive battery impulse every five minutes. Thus pulses at the rate of one per minute to one per five minutes are available for operating the timing switches, such as T1 and T2. In the illustration shown, the conductor 58 over which a pulse is delivered every five minutes is connected to the two timing switches.

When relay 114 operated responsive to the advance of the wipers of marking switch M2 to the first set of bank contacts, as described above, it completed a circuit from the impulse conductor 58, working contact of armature 116 and said armature, armature 108 and its resting contact armature 113 and its resting contact, winding of magnet 132, to negative battery. After from one to five minutes have elapsed, depending upon the position of the rotary switch RS when the impulsing circuit is first closed, a pulse is received over conductor 58 which operates magnet 132 and at the end of the pulse the magnet deenergizes to advance the switch wipers 134 and 135 into engagement with the first set of bank contacts. The magnet 132 is energized and deenergized to advance the switch wipers one step each time a pulse is received over conductor 58, which is every five minutes. The bank of wiper 135 is cross-connected to the bank of wiper 126 of the marking switch M2 by means of a cross-connecting block of frame 136. This frame is provided to facilitate the cross-connection of the switch banks. The manner of cross connection, that is, the particular bank contact of wiper 135 to which each bank contact of wiper 126 is connected depends upon the time interval which is allotted for a plane to travel from one report point to the succeeding report point. In the route which has been used for the purpose of illustration, the following table gives the approximate distances between the various report points and the time allotted for a plane to travel from one point to the succeeding point.

| From | To | Distance | Time allotted |
|---|---|---|---|
| | | Miles | Minutes |
| Cleveland, Ohio | Parkman, Ohio | 35 | 25 |
| Parkman, Ohio | Emlenton, Pa | 78 | 45 |
| Emlenton, Pa | Brookville, Pa | 35 | 25 |
| Brookville, Pa | Kylertown, Pa | 48 | 35 |
| Kylertown, Pa | Bellefonte, Pa | 22 | 20 |
| Bellefonte, Pa | Winklebleck, Pa | 42 | 30 |
| Winklebleck, Pa | Numidia, Pa | 37 | 25 |
| Numidia, Pa | Park Place, Pa | 16 | 15 |
| Park Place, Pa | Newark, N. J | 105 | 60 |

In the assumed case, when the dispatcher received the report that the plane has left Newark he dialled 51, thereby lighting the lamp 3 which illuminates the arrow on the face of the panel opposite the word Newark and the lamp 8 which indicates that the plane belongs to N. A. T. The timing switch T2 is started in the manner previously described and every five minutes a pulse is received over conductor 58 which advances the wipers 134 and 135 one step. Referring to the cross-connecting block 136, the terminal 1, which is connected by cable 131 to the first bank contact engaged by wiper 126 of the marking switch M2, is cross-connected to the twelfth terminal on the left-hand row of terminals of the block. The terminals 1 to 24 of the left-hand terminals of the block are directly connected to the first 24 bank contacts engaged by wiper 135 of the timing switch T2. Thus after approximately sixty minutes have elapsed, wiper 135 will be operated into engagement with its twelfth bank contact which is cross-connected to terminal No. 12 in the left hand row of terminals of block 36. A circuit is then completed from positive battery, wiper 135 and the twelfth bank contact, terminal No. 12, jumper connecting this terminal to terminal No. 1 of the right-hand row of terminals, conductor in cable 131, first bank contact which is now engaged by wiper 126, wipers 126 and 125, multiple bank contacts 1 to 9 of the bank engaged by wiper 125, conductor 137, resting contact of armature 107 and said armature, winding of relay 110 to negative battery.

Relay 110 operates in the above-traced circuit and at armature 112 and its working contact connects positive battery to conductor 57 which is extended over armature 53 and its resting contact through the winding of relay 49 to negative battery. Relay 49 of the interrupter relays IR operates and at armature 51 and its working contact completes the circuit for relay 54. At armature 50 and its working contact it completes the circuit from conductor 57 to the slow-acting relay 52. Relay 54 operates and at armature 55 and its working contact connects positive battery to conductor 56, which is extended over the working contact of armature 111 and said armature, wiper 123 and the first bank contact, conductor #1 in cable 19, lamp 3, to negative battery. The operation of relay 52 opens the circuit of relay 49 at armature 53 and its resting contact, thereby allowing relay 49 to release. Relay 49 in releasing opens the circuit of relay 54 which releases and at armature 55 and its working contact opens the circuit for the lamp 3. Relay 49 also opens the circuit of relay 52 which releases after an interval and again completes the circuit for relay 49. Thus it is seen that the relays 49, 52, and 54 operate intermittently as long as conductor 57 is connected to positive battery. Each time relay 54 operates it connects positive battery to conductor 56 which is extended through the working contact of armature 111 and wiper 123 of the marking switch M2 to flash the lamp 3. This positive potential also extends over armature 115 and its working contact, conductor 18 to lamp 8. The flashing of lamps 3 and 8 indicates that the plane represented by lamp 8 is overdue at the succeeding report point out of Newark. Upon noting the flashing of lamps 3 and 8 the dispatcher will immediately take steps to get in touch with the pilot of the plane and determine his location and the reason for his failure to report from the succeeding report point which is Park Place.

The distance between Newark, New Jersey and Park Place, Pensylvania is approximately one-hundred and five miles and the actual flying time between these two points is about fifty minutes. However, approximately sixty minutes are allowed for the plane to reach Park Place before the lamps 3 and 8 commence to flash to indicate that the plane is overdue. If the plane is running on schedule, the pilot when he reaches Park Place will report to the dispatcher by radio that he has reached Park Place. Upon receiving this report, the dispatcher operates key 21 and again dials the digits 5 and 1. The dialling of these digits operates connector switch C so that wiper 44 is operated into engagement with the bank contact 46 connecting positive battery to conductor 48 and operating the motor magnet 121 of marking switch M2 and relay 105. Relay 105 in operating at armature 109 and its working contact connects positive battery to the multipled bank contacts engaged by wiper 134 of the timing switch T2. This positive battery potential is extended over wiper 134, through interrupter contacts 133, to the motor magnet 132. The motor magnet 132 energizes and interrupts its own circuit to step the wipers 134 and 135 around to the normal position where wiper 134 fails to encounter positive battery potential and the motor magnet 132 remains deenergized. Relay 105 is locked energized until the switch wipers 134 and 135 have returned to normal over a circuit extending from positive battery at armature 109 and its working contact, multipled bank contacts engaged by wiper 134 and said wiper, working contact of armature 106 and said armature, lower winding of relay 105, to negative battery. The dispatcher immediately opens the key 21 after having dialled the number 51 and the connector switch is released in the manner previously described. Positive battery potential is thereby removed from conductor 48 allowing motor magnet 121 to deenergize and step the switch wipers 123 to 126, inclusive, into engagement with the second set of bank contacts. When the timing switch T2 has returned to normal, relay 105 is unlocked and the positive battery potential having been removed from conductor 48, this relay releases. At armature 109 and its working contact it disconnects positive battery from the multipled bank contacts engaged by wiper 134, at armature 108 and its resting contact it again completes the circuit from the pulsing conductor 58 to the motor magnet 132, and at armature 107 and its resting contact it again prepares a circuit for relay 110.

When motor magnet 121 deenergizes it steps the wipers 123 to 126, inclusive, into engagement with the second set of bank contacts. In this position, positive battery is extended from the working contact of armature 111 and said armature, wiper 123 and the second bank contact engaged thereby, conductor 2 in cable 19, lamp 4, to negative battery. The lamp 4 illuminates the arrow on the face of the panel opposite Park Place indicating that the plane represented by lamp 8 has left Park Place. The positive battery potential from the working contact of armature 111 and said armature is also extended over armature 115 and its working contact, conductor 18, lamp 8 to battery to maintain the lamp 8 lighted.

The distance between Park Place and Numidia is approximately sixteen miles and the actual flying time between these two points is about eight minutes. However, approximately fifteen minutes are allowed for the plane to travel from Park Place to Numidia before the alarm to the dispatcher is brought in. If the pilot has not reported from Numidia within the fifteen minutes and the dispatcher has not dialled 51 to advance the marking switch M2 into engagement with the third set of bank contacts to again reset the timing switch T2 to normal, at the end of this interval wiper 135 is operated into engagement with the third bank contact completing a circuit from positive battery, wiper 135 and the third bank contact, terminal 3, the jumper connecting this terminal to terminal 2 in the right-hand row of terminals, conductor 2 in cable 131, second bank contact engaged by wiper 126 and said wiper, wiper 126 and its second bank contact, conductor 137, resting contact of armature 107 and said armature, winding of relay 110, to negative battery. Relay 110 operates and at armature 112 and its working contact starts the operation of the interrupter relays 49, 52, and 54, as previously explained. At armature 113 and its resting contact it opens the pulsing circuit to the motor magnet 132, and at armature 111 and its resting contact it opens the continuous positive battery connection to lamps 4 and 8 and at the working contact of this armature connects these lamps to the intermittent positive battery potential received from the interrupter relays over conductor 56. Lamps 4 and 8 are then flashed to signal the dispatcher that the plane is overdue at Numidia. The dispatcher will then take steps to get in touch with the plane, as previously described.

The above operations are followed throughout the route of the plane. Each time the dispatcher receives a report from the plane that it has reached a certain point he again dials the code number 51 thereby advancing the marking switch M2 one step and lighting the correct lamp to indicate that the plane has reported from that particular report point. Each time the marking switch is advanced one step, the timing switch T2 is again reset to its normal position and is restarted to time the interval between the succeeding two report points. In case the dispatcher has not dialled the number 51 to advance the lighted lamp before the time allotted for the plane to travel between the two report points, the lamp will flash to indicate that the plane is overdue at the succeeding report point. The operator then takes steps to get in touch with the pilot of the plane and determine the reason for his delay.

The operation of the marking switch M1 and the timing switch T1, which are associated with a plane of Itinerant #1 represented by lamp 13, is similar to that just described for switches M2 and T2. Assuming that the dispatcher has received the report that the plane represented by lamp 13 has left Cleveland, he dials the code number assigned to this plane, for example 61. The connector switch C is operated responsive to these digits to bring its wiper 44 into engagement with bank contact 45 thereby connecting positive battery over conductor 47 to motor magnet 77 and the upper winding of relay 72. Magnet 77 and relay 72 energize until the dispatcher again opens the key 21 and allows the connector to release. Magnet 77 then deenergizes and steps the wipers 90 to 93, inclusive, into engagement with their first bank contacts. This results in the lighting of lamp 13 and the lamp located under the transparent arrow 6 opposite Cleveland in the left-hand column of arrows. Relay 83 is operated over wiper 91 and the multipled bank contact engaged thereby, and at armature 85 and its working contact completes the circuit from the pulse conductor 58, working contact of armature 85 and said armature, armature 75 and its resting contact, armature 82 and its resting contact, winding of magnet 100, to negative battery. A pulse is received over conductor 58 every five minutes and the wipers 102 and 103 of timing switch T1 are advanced one step for each five minutes of elapsed time. The distance between Cleveland, Ohio, and Parkman, Ohio, is approximately thirty-five miles and a plane is allowed approximately twenty-five minutes to travel this distance. The first terminal of the right-hand row of terminals of connecting block 104 is, therefore, jumpered to the fifth terminal in the left-hand row of terminals which in turn is conected to the fifth bank contact engaged by wiper 103. In case the pilot of the plane has not reported from Parkman within twenty-five minutes and the dispatcher has not again dialled the code 61 to advance the marking switch M1 and to reset the timing switch T1 to normal, at the end of this allotted time the wiper 103 is operated into engagement with the fifth bank contact thereby completing a circuit from positive battery, wiper 103 and its fifth bank contact, left-hand terminal No. 5, jumper to the right-hand terminal No. 1, conductor No. 1 in cable 99, the first bank contact engaged by wiper 93 and said wiper, wiper 92 and its first bank contact, conductor 98, resting contact of armature 74 and said armature, winding of relay 79 to battery. Relay 79 operates and at armature 81 and its working contact connects positive battery to conductor 57 to start the operation of the interrupter relays 49, 52, and 54. At armature 82 and its resting contact it opens the pulsing circuit to the magnet 100 and at armature 80 and its resting contact it opens the continuous positive battery connection to lamps 13 and 6 and at the working contact of this armature connects these lamps to the intermittent positive battery potential supplied over conductor 56. Lamps 13 and 6 are thereby flashed to indicate to the dispatcher that the plane represented by lamp 13 and operated by Itinerant #1 has failed to report from Parkman and is overdue there. The dispatcher then takes steps to get in touch with the pilot of the plane to determine the reason for its delay.

The dispatcher follows the flight of the plane in the same manner as previously explained, dialling the code number 61 each time he receives a report from the pilot that the plane is over a certain report point, the dialling of these digits advancing the lamps to the next report point and resetting the timing switch to zero. In case the pilot fails to report within the allotted time and the dispatcher has not dialled the code number 61 to advance the marking switch M1, the lamps are flashed to inform the dispatcher that the plane is overdue at a particular point.

When the plane reaches Newark, the dispatcher again dials the digit 61 to light the lamp opposite Newark to indicate that the plane has reached the end of its route. The tenth right-hand terminal on connecting block 104 is cross-connected to the second left-hand terminal which in turn is connected to the second bank contact engaged by wiper 103. Approximately ten minutes after the plane has reached the end of its route at Newark, wiper 103 is operated into engagement with the second bank contact, thereby completing a circuit from positive battery, wiper 103 and its second bank contact, second left-hand terminal of block 104, jumper to the tenth right-hand terminal of the block, tenth conductor in cable 99, bank contact No. 10 engaged by wiper 93 and said wiper, wiper 92 and its tenth bank contact 96, conductor 97, relay 87, to negative battery. Relay 87 operates and at armature 88 and its working contact locks itself operated to the positive battery supplied over wiper 91 and the multipled bank contacts engaged thereby. At armature 89 and its working contact it completes a restoring circuit for the marking switch M1. This restoring circuit extends from positive battery on wiper 91, multipled bank contacts engaged by this wiper, armature 89 and its working contact, interrupter contact 78, winding of magnet 77, to negative battery. This positive battery potential also operates relay 72 which locks itself operated from positive battery at armature 76 and its working contact, multipled bank contacts engaged by wiper 102 of timing switch T1 and said wiper, working contact of 15 armature 73 and said armature, lower winding of relay 72, to negative battery. The positive battery connection over wiper 102 also extends over the interrupter contacts 101 to magnet 100. Marking switch M1 and timing switch T1 are then returned to their normal positions over the above restoring circuits. As soon as wiper 102 reaches its normal bank contact, it no longer encounters positive battery potential and magnet 100 deenergizes as does also relay 72. Relay 83 deenergizes as soon as wiper 91 reaches its normal position and the positive battery potential is also removed from relay 87 which also releases. All of the apparatus used in connection with this particular flight has now been restored to normal.

From the foregoing explanation, it is seen that the invention provides a simple and convenient system by means of which a dispatcher can keep track of all the airplanes flying over a particular route and whereby the dispatcher is informed at all times as to the position of each plane. All that is required of the dispatcher is that he dial the correct code number when one of the planes reports from a particular point. He need pay no further attention to the planes except when one of the lamps begins to flash which indicates to him that the corresponding plane is overdue at the succeeding report point and has not been heard from. He may then take steps to locate such a plane. It will be at once apparent to those skilled in the art that the invention is not limited to an aircraft position report board, but is equally applicable to other dispatcher's control systems or other types of apparatus such as might be used in connection with a train dispatching or other similar systems.

Having described the invention, what is thought to be new and is desired to have protected by Letters Patent will be pointed out in the appended claims.

What is claimed is:

1. In combination, a plurality of lamps each representing a point along the route of a moving object, a dispatcher's station, a marking switch having a plurality of positions, means controlled from said station for advancing said marking switch from one position to another, a circuit completed by said marking switch in each position for lighting a lamp representing a point in the route of said object, a timing switch for measuring the off varying time intervals chosen to correspond to the time allotted for the object to pass between points represented by the lamps, means for resetting said timing switch to normal and restarting it each time said marking switch is advanced, and means controlled by the timing switch in case said marking switch is not advanced before said interval is measured off for flashing the last lighted lamp.

2. In combination, a plurality of lamps each representing a point along the route of a moving object, a dispatcher's station, a marking switch and a timing switch, means controlled from said station for advancing said marking switch step by step, means controlled by said marking switch for lighting said lamps in succession as the switch is advanced, means for restoring said timing switch each time said marking switch is advanced and restarting it to measure off a time interval chosen to correspond to that required for said object to travel from one point to the succeeding point, means controlled by the position of the marking switch for determining the time interval measured off, and means controlled by said timing switch for flashing the last lighted lamp in case said marking switch has not been advanced within said measured length of time.

3. In combination, a plurality of series of lamps each series for indicating the position of a moving vehicle, each lamp in a series representing a point along the route over which the vehicle travels, a dispatcher's station equipped with a dial, means responsive to the dialing of a particular code number for selecting a particular series and lighting the first lamp thereof to indicate that a vehicle has left the starting point, means effective each time said code number is subsequently dialled for extinguishing the lighted lamp and lighting the succeeding lamp in said series to indicate that the vehicle has reached a corresponding point, timing means for measuring time intervals within which successive dialings of the code number should be made, a predetermined time being allotted between successive diallings corresponding to the time allotted for the vehicle to travel from one point to the succeeding point corresponding to the particular diallings, and means controlled by said timing means and effective in case the code number is not dialed within the time allotted for the vehicle to travel from one point to the succeeding point for flashing the lighted lamp to indicate that the vehicle is overdue at said succeeding point.

4. In combination, a plurality of lamps for indicating the position of a moving vehicle, each lamp representing a point along the route over which the vehicle travels, a dispatcher's station equipped with a dial, means responsive to the dialling of a particular code number for lighting the first lamp to indicate that the vehicle has left its starting point, means effective each time said code number is dialed, for extinguishing the lighted lamp and lighting the succeeding lamp, timing means for measuring off varying time intervals chosen to correspond with the time required for the vehicle to travel between adjacent points, means controlled by said timing means for flashing the lighted lamp in case the code number is not dialled within the time measured off, and means responsive to each dialing of the code number for restarting said timing means to measure off another time interval corresponding to that allotted for the next dialling to take place in accordance with the time required for the vehicle to reach the succeeding point.

5. In combination, an air route having a plurality of points from which the pilots of planes flying over the route report, a dispatcher's station equipped with a dial, a row of lamps for each flight over said route, each lamp representing one of said report points for that flight, means responsive to the dialing of a particular code number indicative of a particular flight for selecting a row of lamps and lighting the lamp representing the point from which the plane is starting, and means effective each time said code number is dialed for extinguishing the lighted lamp and for lighting the next succeeding lamp to indicate that the plane has reached the succeeding report point.

6. In a dispatching system for an air route having a plurality of points from which pilots of the planes flying over the route report, a dispatcher's station equipped with a dial, a row of lamps for each flight over said route, each lamp in a row representing one of said report points, means responsive to the dialling of a code number indicative of a particular flight for selecting a row of lamps corresponding to the flight and lighting the lamp representing the point from which the plane is starting, means responsive to a second dialing of said code number for extinguishing the lighted lamp and for lighting the next succeeding lamp in the row to indicate that the plane has reached the succeeding report point, and means effective in case the code number is not dialed within a predetermined time after the first lamp is lighted for flashing said first lamp to inform the dispatcher that the plane is overdue at the second report point.

7. In combination, an indicator board comprising a plurality of groups of lamps, each group representing the route of a movable object and each lamp in each group representing a point in the route of the object of that group, a step by step switch, a dispatcher's station, a timing switch for each group of lamps, means controlled from the dispatcher's station for operating the switch to select a group of lamps, to light one of said lamps, and to start the timing switch thereof, means controlled by the position of the marking switch for determining the time interval measured off by the timing switch, and means controlled by the timing switch for signalling the dispatcher if the marking switch is not operated before the interval is measured off.

HARRY E. HERSHEY.